(12) United States Patent
Hähnel et al.

(10) Patent No.: US 6,474,526 B1
(45) Date of Patent: Nov. 5, 2002

(54) METHOD FOR FRACTURE-SEPARATING AN ANNULAR PIECE

(75) Inventors: Michael Hähnel, Essingen; Horst Wisniewski, Reutlingen, both of (DE)

(73) Assignee: Alfing Kessler Sondermaschinen GmbH, Aalen (DE)

( * ) Notice: Subject to any disclaimer, the term of this patent is extended or adjusted under 35 U.S.C. 154(b) by 0 days.

(21) Appl. No.: 09/463,824
(22) PCT Filed: Jul. 30, 1998
(86) PCT No.: PCT/EP98/04766
  § 371 (c)(1),
  (2), (4) Date: Apr. 10, 2000
(87) PCT Pub. No.: WO99/06170
  PCT Pub. Date: Feb. 11, 1999

(51) Int. Cl.[7] ............................. B26F 3/00; B23P 17/00
(52) U.S. Cl. ............... 225/100; 225/103; 225/96.5; 29/888.09
(58) Field of Search ............... 225/96, 96.5, 100, 225/101, 104, 105, 103; 29/888.09, 413, 416

(56) References Cited

U.S. PATENT DOCUMENTS

| | | | |
|---|---|---|---|
| 5,105,538 A | * 4/1992 | Hoag | 29/888.09 |
| 5,169,046 A | * 12/1992 | Miessen et al. | 225/100 |
| 5,263,622 A | * 11/1993 | Henzler et al. | 225/103 |
| 5,320,265 A | * 6/1994 | Becker | 225/104 |
| 5,503,317 A | * 4/1996 | Jones et al. | 225/103 |
| 5,568,891 A | * 10/1996 | Hoag | 225/93 |
| 5,974,663 A | * 11/1999 | Ikeda et al. | 29/888.09 |
| 6,125,536 A | * 10/2000 | Spurny | 29/888.09 |

FOREIGN PATENT DOCUMENTS

| | | | | |
|---|---|---|---|---|
| DE | 44 13 255 A1 | 10/1995 | | B26F/3/00 |
| DE | 44 42 062 A1 | 5/1996 | | B26F/3/00 |
| EP | 724358 | 2/1955 | | |
| EP | 0 396 797 A1 | 5/1989 | | F16J/9/04 |
| EP | 0 661 125 A1 | 12/1993 | | B23D/31/00 |
| GB | 2 526 698 | 5/1982 | | B23P/15/06 |
| JP | 405261626 A | * 10/1993 | | 29/888.09 |
| JP | 405277843 A | * 10/1993 | | 29/888.09 |

* cited by examiner

*Primary Examiner*—Allan N. Shoap
*Assistant Examiner*—Isaac N. Hamilton
(74) *Attorney, Agent, or Firm*—Taylor & Aust P.C.

(57) ABSTRACT

An apparatus fracture-separates an annular piece, such as a connecting rod. The apparatus includes one stationary and one mobile expandable jaw for insertion into a bore hole in the annular piece. An expanding device separates the expandable jaws. The fracture behavior of the annular piece can be influenced. To this effect, the peripheral surface of the expandable jaws is so configured that the expandable jaws engage in the inner surface of the bore hole only via a region of reference surfaces or lines which is defined locally with precision.

23 Claims, 3 Drawing Sheets

METHOD FOR FRACTURE-SEPARATING AN ANNULAR PIECE

BACKGROUND OF THE INVENTION

1. Field of the Invention

The present invention relates to an apparatus for crack splitting an annular part, such as the big-end of a connecting rod, by use of a fixed expander jaw and a movable expander jaw for engaging the bore formed by the annular part, and by use of an expander device urging the expander jaws apart.

2. Description of the Related Art

An apparatus for crack splitting an annular part is known, for example, from European patent document nos. EP-0 396 797 and EP-0 661 125. Such devices serve to split an integral annular part, in this case the big-end of a connecting rod, by cracking it into two parts, i.e., into a cap and rod. These known devices include expander jaws whose peripheral surface area is in full contact with the inner surface area of the big-end bore. Such a full contact of the expander jaws with the bore is generally deemed necessary for a neat split.

SUMMARY OF THE INVENTION

The peripheral surface area of the expander jaws of the present invention is configured such that the expander jaws engage the inner surface area of the bore only via a precisely localized partial surface area or linear portion, so that the cracking response can be influenced.

Tests have indicated, surprisingly, that best crack splitting is not always achievable by full contact of the peripheral surface area of the expander jaws with the inner surface area of the bore. Instead, it may be advantageous, depending on the material of the annular part and its cracking response as well as other parameters, such as the geometry of the fracture surface area, to introduce the cracking force only into a specific partial surface area portion or line of the piece concerned. Thus, it may be expedient to introduce the cracking force to only partial or linear surface areas, either axially or circumferentially into the bore. In special instances it may also be advantageous to introduce the cracking force both axially and circumferentially.

Tests have also surprisingly indicated that such a configuration prevents double fractures, crumbling and snags from materializing when nuisance geometry involving bores, holes and the like exists within the crack surface, as is often experienced with known devices. For instance, big-ends feature two holes in the region of the crack surface for bolting the cap and rod together after splitting. When splitting is initiated, the crack flows from the crack initiating crevice, which is provided in the region of the inner surface area of the bore in manufacturing the connecting rod, laterally around the bolting holes outwards. The crack surfaces reunite behind the bolting holes. However, since the crack surfaces fail to be automatically propagated in the same plane on both sides of the bolting holes, double cracks, crumbling and snags may materialize when the crack surfaces reunite. Such double cracks, crumbling and snags are to be avoided.

The partial surface area or line portion via which the cracking force is introduced can be configured in many different ways. Defining or optimizing the particular configuration and localization may be done by trial and error. Thus, for instance, the partial surface area of the expander jaws—as viewed in the radial direction of the bore—may be barreled or conical. The radius of the expander jaws may also be larger than the radius of the bore in the annular part to compensate for the so-called contraction effects.

For particular applications it may be expedient to provide an elastic material at the peripheral surface area of the expander jaws. This elastic material may extend partially or entirely over the peripheral surface area. Tests have indicated that, depending on the particular application, the elastic material may have a hardness of 50 to 95 Shore A. For special applications, it may be advantageous to configure the elastic material in the form of a sleeve. This sleeve may be arranged, for example, centered relative to, or concentric with the inner surface area of the bore. Due to this arrangement of the elastic material, peak stresses resulting in uncontrolled crack propagation can be prevented. Providing elastic material may also be particularly suitable in cases where the bore of the annular part needs to be split in the non-machined condition. For specific applications, the elastic material may also be arranged in the form of elastic segments on the peripheral surface area of the expander jaws.

The expander device may also be configured such that each expander jaw has two-parts, i.e., an expander jaw core and an expander jaw shell. The outer surface area of the expander jaw shell engages the inner surface area of the bore in the annular part. In such a configuration, the outer surface area of the expander jaw shell may or may not be cylindrical.

The advantage of configuring the expander jaws with a core and shell is that the apparatus can be adapted very simply to annular parts of differing shape and size. This merely requires the expander jaw shell to be changed, whereas no change to the expander jaw core, including the expander device, is required. It is also possible to influence the cracking response simply by swapping the expander jaw shell. Thus, to achieve a specific crack where necessary for an identical annular part, the expander jaw shell can be swapped with another having a differently shaped outer surface area. This can be repeated until the desired, optimum cracking response is attained.

Expander jaw shells can be produced in many different ways. One particularly simple and cheap embodiment is achieved by machining the expander jaw shell as a turned component which is split into two or more ring segments in a subsequent operation.

In principle, the expander jaw shell or its ring segments are securable to the expander jaw core in many different ways. For example, each expander jaw shell can be flanged at one edge for receiving the retaining devices, such as fastener bolts, quick-release fasteners, or the like.

As described above, the present invention makes it possible to introduce the cracking force into the annular part such that initiation and propagation of the crack are defined, thus enabling the cracking response to be precisely influenced. In this respect, by varying the geometry of the expander jaws in accordance with the present invention, the cracking response can be influenced both in any non-machined and in any rough-machined or finished condition of the bores and holes in the annular part.

BRIEF DESCRIPTION OF THE DRAWINGS

Embodiments of the invention will now be detailed for further explanation and a better understanding of the invention with reference to the attached drawings in which.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
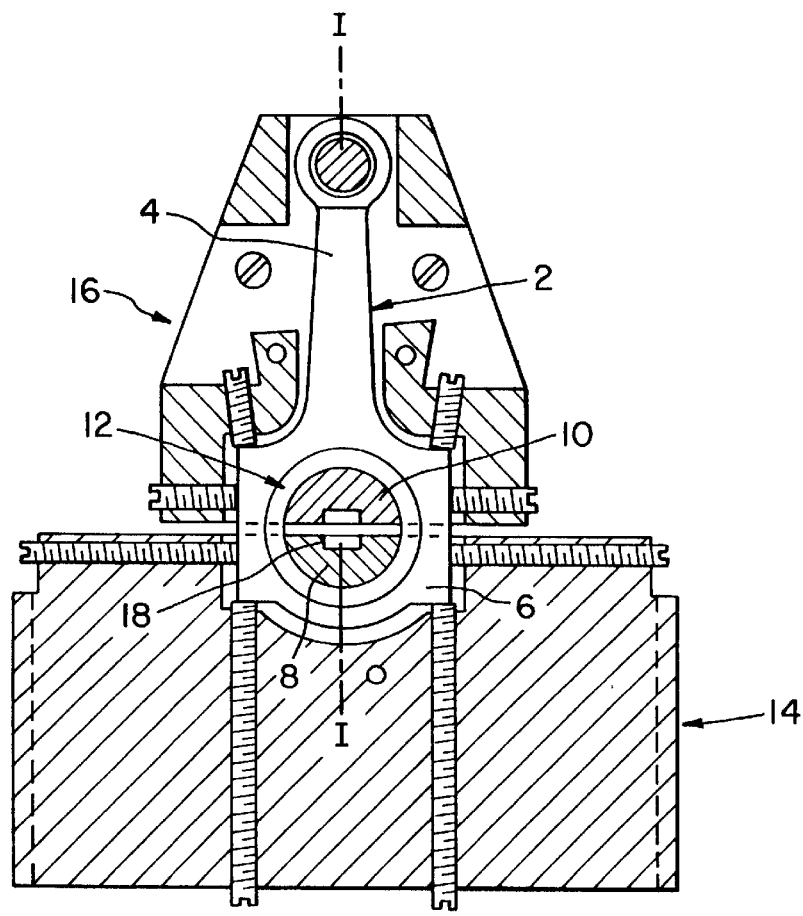
FIG. 1 is a schematic plan view of components of a first embodiment of the apparatus in accordance with the invention.

Referring now to FIG. 1, there is illustrated an embodiment of an annular part in the form of a connecting rod big-end 2 to be split into a rod 4 and a cap 6 in the apparatus. Essential for splitting the rod 4 and cap 6 of the big-end 2 is the action of a movable expander jaw 8 and a fixed expander jaw 10 in a bore in the form of a cylindrical big-end bore 12 formed by the cap 6 and rod 4. The movable expander jaw 8 is secured to a movable part 14 of the apparatus, and the fixed expander jaw 10 is secured to a fixed part 16 of the apparatus. To split rod 4 and cap 6, the two parts 14, 16 of the apparatus are abruptly powered apart, for example by use of a striker impacting the movable part 14 of the apparatus. As an alternative, splitting may also be achieved by a cleaving wedge 17 (FIG. 8) engaging with and being abruptly powered into a notch 18 oriented axially in the middle of the two expander jaws 8, 10.

Figure 2:
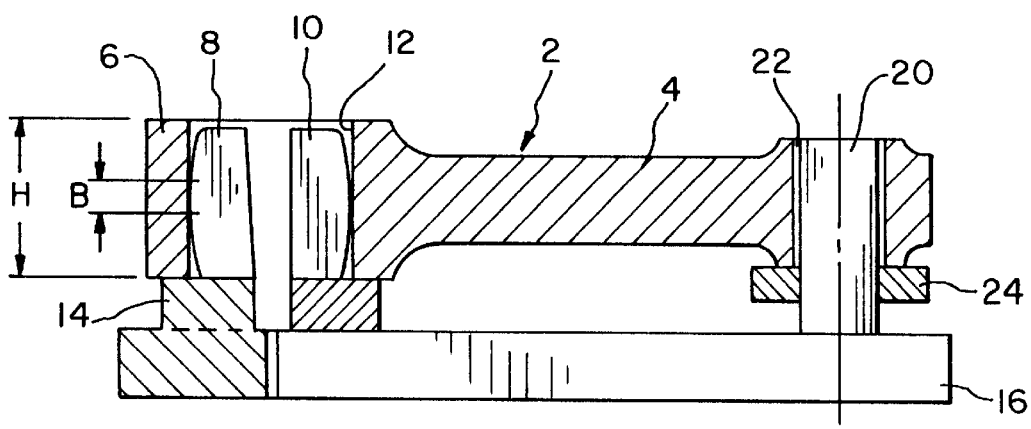
FIG. 2 is a schematic, longitudinal section taken along the line I—I as shown in FIG. 1.

In the embodiment as shown in FIG. 1 and FIG. 2, the two expander jaws 8, 10 each have a semicircular cross-sectional surface area. As evident from FIG. 2, showing a longitudinal section taken along the line I—I of FIG. 1, the expander jaws 8, 10 of the first illustrated embodiment are barrel-shaped. The largest radius of the semicircular expander jaws 8, 10 is arranged in the middle of the big-end bore 12. The portion having maximum radius extends over a span B of approximately 10% of the axial height H of the big-end bore 12. As a result, the expansion force is introduced into a precisely defined middle portion of the big-end bore 12. This configuration is particularly suitable for materials of inconsistent hardness, posing the risk of a partially high hardness resulting in a random start in the crack.

Figure 3:
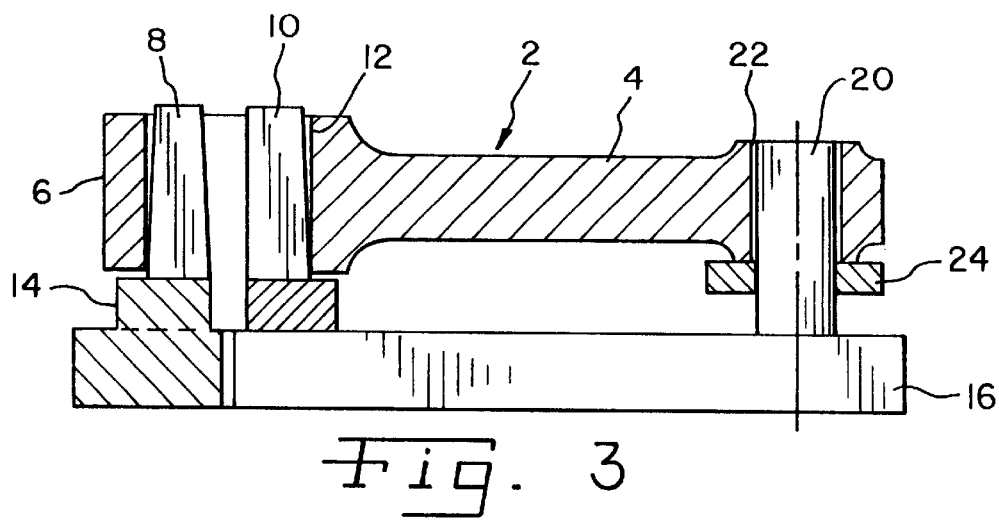
FIG. 3 is a schematic, longitudinal section of a second embodiment of the present invention taken along the line I—I as shown in FIG. 1.

Referring now to FIG. 3, there is illustrated schematically a second embodiment of the present invention in a longitudinal section taken along the line I—I as shown in FIG. 1. Here too, the expander jaws 8, 10 have a substantially semicircular cross-sectional surface area. However, the expander jaws 8, 10 in accordance with the second embodiment are shaped conically. At the location where the diameter of the big-end bore 12 roughly corresponds to the outer diameter of the two expander jaws 8, 10, the big-end 2 is in contact with the expander jaws 8, 10 in the region of the big-end bore 12.

A cylindrical retaining element 20 arranged on a fixed part 16 of the apparatus protrudes into a small end bore 22. Arranged between the big-end 2 and the part 16 of the apparatus is a support 24 which is shiftable in the longitudinal direction of the retainment element 20. It is this arrangement that makes it possible to support the big-end 2 so that the bore centerlines of the small-end and big-end are located at a precise right angle to the movement of the movable part 14 of the apparatus upon splitting the cap 6 from the rod 4. It is this location that is important for achieving a neat crack. Since the support 24 is height-adjustable, it is possible to ensure this location even when the bore centerlines of the big-end and small-end fail to be in a single plane. Due to the support of the big-end 2, the conical expander jaws 8, 10 and the big-end bore 12 are located concentrically, resulting in the force being introduced linearly into an outer edge of the big-end bore.

When the two expander jaws 8, 10 for splitting the cap 6 from the rod 4 are powered apart, the crack propagates from the outer edge substantially along the centerline of the big-end bore 12. Due to the force being introduced along a very thin line at the edge of the big-end bore 12, the embodiment of FIG. 3 is particularly suitable for connecting rods made of a very hard material. However, big-ends of connecting rods made of a less hard material may also be split by the embodiment of FIG. 3. To prevent the circumferential surface area of the big-end bore being deformed in splitting, the big-end may be provided with a chamfer at the outer edge.

Figure 4:
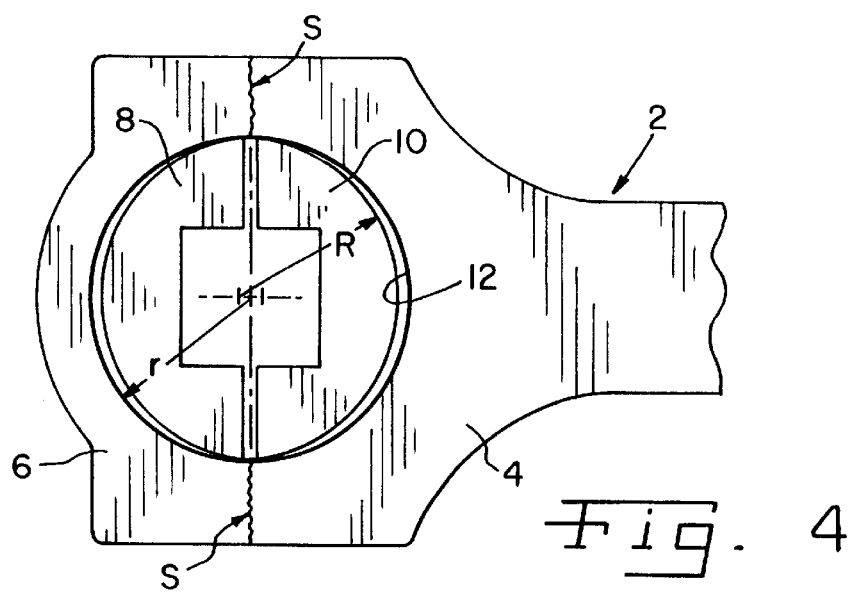
FIG. 4 is a schematic plan view on a magnified scale of a portion of the expander jaws in a third embodiment of the present invention.

Referring now to FIG. 4, there is illustrated a third embodiment of the present invention. In this third embodiment too, the expander jaws 8, 10 each have a substantially semicircular cross-sectional surface area. Unlike the expander jaws 8, 10 of FIGS. 2 and 3, however, the expander jaws 8, 10 of FIG. 4 are shaped cylindrically. Correspondingly, the expander jaws 8, 10 have a constant radius along their entire length. In FIG. 4, the radius R of the expander jaws 8, 10 is greater than the radius r of the big-end bore 12. Thus, a roughly elliptical cross-sectional shape materializes for the expander jaws 8, 10 in the run-together condition.

It is due to this elliptical cross-sectional shape that the cracking force during splitting is first introduced into the big-end 2 in the region of the crack-initiating crevices S. This results in the big-end bore 12 being "expanded" transversely to the longitudinal direction of the big-end 2 during splitting. It is this "expansion" that counteracts the "contraction" often experienced in splitting big-ends and caused by stresses being released.

Figure 5:
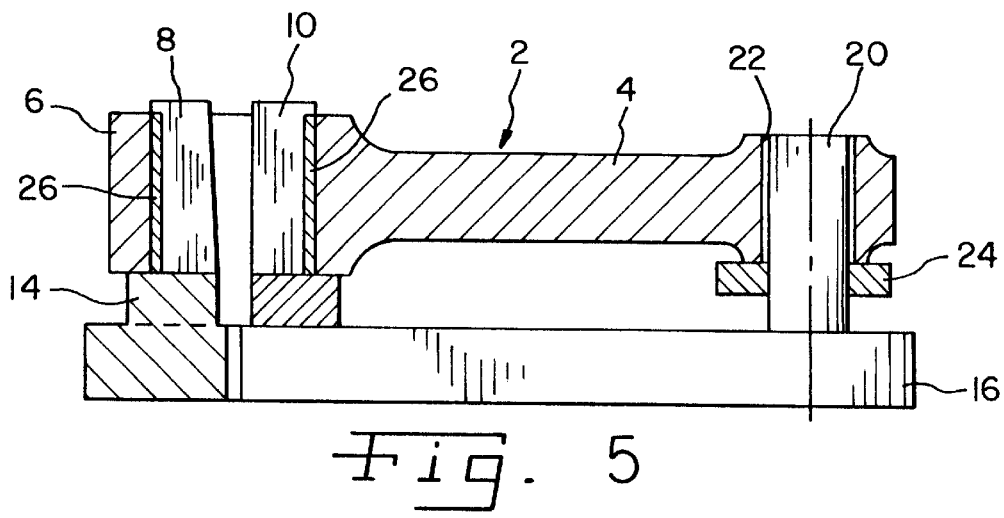
FIG. 5 is a schematic, longitudinal section of a fourth embodiment of the present invention taken along the line I—I as shown in FIG. 1.

Referring now to FIG. 5, there is illustrated a fourth embodiment of the present invention in which an elastic material 26, such as rubber, is secured, for example, by cementing or coating, to the circumferential surface area of the expander jaws 8, 10. This arrangement of the elastic material 26 prevents peak stresses occurring when splitting big-ends having a non-machined big-end bore or should soilage be involved in splitting. The elastic material 26 surrounding the two expander jaws 8, 10 has the further advantage that the parts 14, 16 of the apparatus are cushioned when powered apart.

Figure 8:
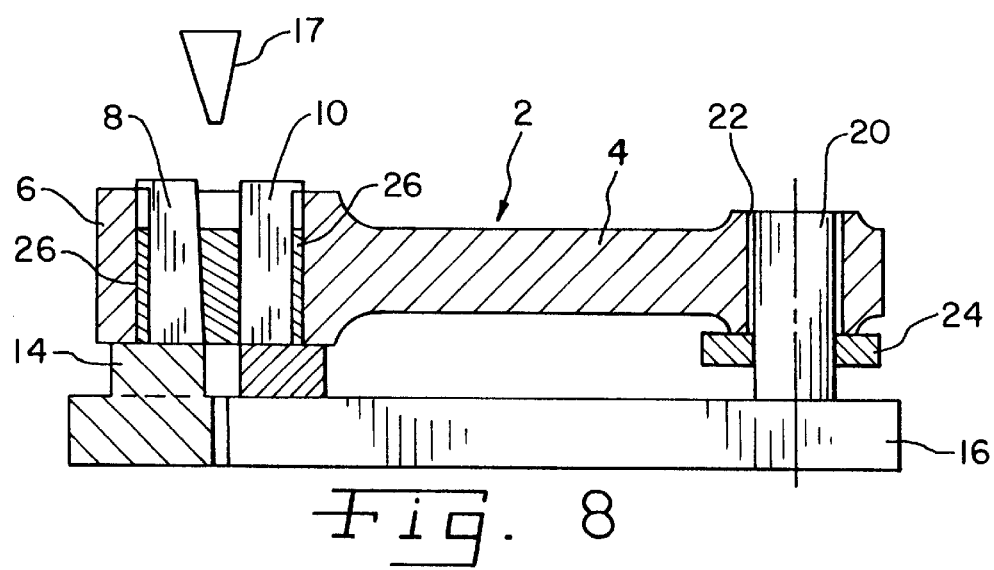
FIG. 8 is a schematic, longitudinal section of a fifth embodiment of the present invention taken along the line I—I as shown in FIG. 1.

Referring now to FIG. 8, there is illustrated a fifth embodiment in which elastic material 26 forms a sleeve whose length is smaller than height H of bore 12.

Figure 6:
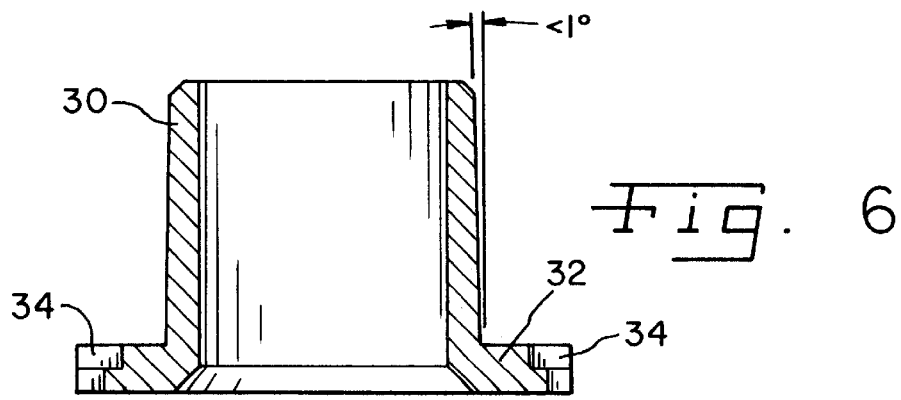
FIG. 6 is a longitudinal section through one embodiment of a expander jaw shell prior to the ring segments being separated.
Figure 7:
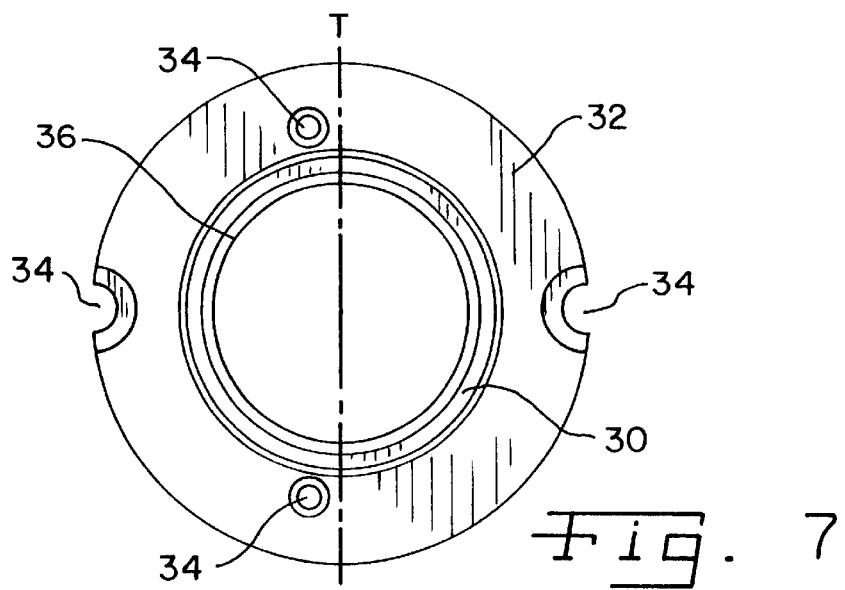
FIG. 7 is a plan view of the expander jaw shell as shown in FIG. 6.

Referring now to FIG. 6, there is illustrated a longitudinal section through a blank for an expander jaw shell. The blank still to be split includes a shell segment 30 and a flanged segment 32. The shell segment 30 includes a circular cylindrical inner surface area, the radius of which corresponds to the radius of a corresponding expander jaw core 36 (FIG. 7). In the present embodiment, the outer surface area of the shell segment 30 is conically tapered at an angle of less than 1°. In addition, the upper face is chamfered to facilitate mounting the big-end bore 12 on the expander jaws.

To produce the ring segments, the turned expander jaw shell is split along the line T—T, resulting in two identical shell halves, i.e., a first expander jaw shell and a second expander jaw shell. The two shell halves are formed from a common turned part. The common turned part is split into the first expander jaw shell and the second expander jaw shell. For securing and centering the shell halves to the movable part 14 and to the fixed part 16 of the apparatus, holes or half holes 34 are provided in the flanged segment 32. It is due to this configuration that the apparatus can be simply adapted for splitting big-ends differing in shape and size by merely removing the ring segments or the shell halves and replacing them with those of a different size. There is thus no need to retrofit or change the expander jaw core with all elements of the expander device.

Making use of expander jaw shells enables the cracking response to be influenced by simple ways and devices, if needed. To achieve the specific crack in each case, all that is needed is to make use of the ring segments or shell halves including the outer surface area most expedient for the desired cracking response.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for crack splitting a connecting rod big-end having a bore with a cylindrical inner surface and a height in an axial direction, said apparatus comprising:
    a movable expander jaw including a first peripheral surface configured for engaging only a first portion of the inner surface of the bore, the first portion extending in a circumferential direction substantially perpendicular to the height, the first portion having a first span in the axial direction, the first span being less than the height;
    a fixed expander jaw opposing said movable expander jaw in a radial direction, said fixed expander jaw including a second peripheral surface configured for engaging only a second portion of the inner surface of the bore, the second portion extending in a circumferential direction substantially perpendicular to the height, the second portion having a second span in the axial direction, the second span being less than the height; and
    an expander device configured for causing said movable expander jaw to move in the radial direction away from said fixed expander jaw.

2. The apparatus of claim 1, wherein each of said movable expander jaw and said fixed expander jaw has a substantially semicircular cross section.

3. The apparatus of claim 1, wherein said first peripheral surface and said second peripheral surface are conjunctively barrel-shaped when viewed in a radial direction.

4. The apparatus of claim 1, wherein said first peripheral surface and said second peripheral surface are conjunctively conically shaped when viewed in a radial direction.

5. The apparatus of claim 1, wherein the bore has a first radius, said first peripheral surface of said movable expander jaw defining a second radius, said second radius being greater than the first radius, said second peripheral surface of said fixed expander jaw defining a third radius, said third radius being greater than the first radius.

6. The apparatus of claim 1, further comprising:
    a first layer of elastic material attached to said first peripheral surface of said movable expander jaw; and
    a second layer of elastic material attached to said second peripheral surface of said fixed expander jaw.

7. The apparatus of claim 6, wherein said elastic material comprises rubber.

8. The apparatus of claim 6, wherein said elastic material has a hardness of approximately between 50 Shore A and 95 Shore A.

9. The apparatus of claim 6, wherein said first layer of elastic material and said second layer of elastic material conjunctively form a sleeve with a length, said length being less than the height of the bore.

10. The apparatus of claim 9, wherein said sleeve is substantially concentric with the inner surface of the bore.

11. The apparatus of claim 1, wherein said movable expander jaw includes a first expander jaw core and a first expander jaw shell having a first outer surface, said fixed expander jaw including a second expander jaw core and a second expander jaw shell having a second outer surface, each of said first outer surface and said second outer surface being configured for engaging the inner surface of the bore.

12. The apparatus of claim 9, wherein said first expander jaw shell is releasably connected to said first expander jaw core, said second expander jaw shell being releasably connected to said second expander jaw core.

13. The apparatus of claim 9, wherein said first expander jaw shell and said second expander jaw shell are formed from a common turned part, said common turned part being split into said first expander jaw shell and said second expander jaw shell.

14. The apparatus of claim 9, wherein said first expander jaw shell includes a first rim and a first flange attached to said first rim, said second expander jaw shell including a second rim and a second flange attached to said second rim.

15. The apparatus of claim 12, further comprising a movable part and a fixed part, said first flange including one of a first hole and a first half hole for centering said first expander jaw shell and for securing said first expander jaw shell to said movable part, said second flange including one of a second hole and a second half hole for centering said second expander jaw shell and for securing said second expander jaw shell to said fixed part.

16. An apparatus for crack splitting a connecting rod big-end having a cylindrical bore with an inner surface and a first radius, said apparatus comprising:
    a movable expander jaw including a first arcuate peripheral surface configured for engaging only a first portion of the inner surface of the bore, said first arcuate peripheral surface defining a second radius, said second radius being greater than the first radius;
    a fixed expander jaw opposing said movable expander jaw in a radial direction, said fixed expander jaw including a second arcuate peripheral surface configured for engaging only a second portion of the inner surface of the bore, said second arcuate peripheral surface defining a third radius, said third radius being greater than the first radius; and an expander device configured for causing said movable expander jaw to move in the radial direction away from said fixed expander jaw.

17. The apparatus of claim 16, wherein the bore has a height in an axial direction, the first portion of the inner surface of the bore extending in both a circumferential direction substantially perpendicular to the height and the axial direction substantially parallel to the height, the second portion of the inner surface of the bore extending in both the circumferential direction and the axial direction.

18. The apparatus of claim 17, wherein said movable expander jaw and said fixed expander jaw conjunctively define a substantially elliptical cross section.

19. The apparatus of claim 18, wherein the big-end has a longitudinal direction, said substantially elliptical cross section having a longitudinal axis oriented transverse to the longitudinal direction of said big-end, the big-end having two opposing crack-initiating crevices defining a cracking plane oriented traverse to the longitudinal direction of the big-end, the cracking plane intersecting each of the first portion and the second portion of the inner surface of the bore, said movable expander jaw and said fixed expander jaw being configured for conjunctively exerting a cracking force onto the crack-initiating crevices to thereby expand the bore in the longitudinal direction of the big-end.

20. The apparatus of claim 16, wherein said expander device comprises a cleaving wedge.

21. An apparatus for crack splitting a connecting rod big-end having a bore with an inner surface and an axis, said apparatus comprising:

a movable expander jaw configured for engaging only a first portion of the inner surface of the bore;

a fixed expander jaw opposing said movable expander jaw in a radial direction, said fixed expander jaw configured for engaging only a second portion of the inner surface of the bore;

an expander device configured for causing said movable expander jaw to move away from said fixed expander jaw; and a movable support configured for shiftably supporting the connecting rod big-end such that the axis of the bore is substantially perpendicular to a direction of movement of said movable expander jaw, said support being movable in a direction substantially perpendicular to the direction of movement of said movable expander jaw.

22. An apparatus for crack splitting a connecting rod big-end having a bore with an inner surface and an axis, the connecting rod having a small end, said apparatus comprising:

a movable expander jaw configured for engaging only a first portion of the inner surface of the bore;

a fixed expander jaw opposing said movable expander jaw in a radial direction, said fixed expander jaw configured for engaging only a second portion of the inner surface of the bore;

an expander device configured for causing said movable expander jaw to move away from said fixed expander jaw; and a movable support configured for:

shiftably supporting the connecting rod big-end such that the axis of the bore is substantially perpendicular to a direction of movement of said movable expander jaw; and contacting the small end of the connecting rod.

23. The apparatus of claim 22, wherein the small end of the connecting rod has a small end bore, said apparatus further comprising a retaining element configured for protruding into the small end bore, said support being disposed at least partly around said retaining element.

\* \* \* \* \*

UNITED STATES PATENT AND TRADEMARK OFFICE
CERTIFICATE OF CORRECTION

PATENT NO. : 6,474,526 B1
DATED : November 5, 2002
INVENTOR(S) : Michael Hähnel et al.

It is certified that error appears in the above-identified patent and that said Letters Patent is hereby corrected as shown below:

Title page,
After Item [87], "PCT Pub. Date: Feb. 11, 1999", insert the following:

-- [30]      Foreign Application Priority Data
   Aug. 1, 1997      DE.......................197 33 387.7 --.

Column 6,
Lines 32, 36 and 41, delete "9" and substitute -- 11 --; and
Line 45, delete "12" and substitute -- 14 -- therefor.

Signed and Sealed this

Twenty-fourth Day of August, 2004

JON W. DUDAS
*Director of the United States Patent and Trademark Office*